Jan. 26, 1965   D. A. BUMPIOUS   3,167,327
STEERING AND SUPPORT DEVICE
Filed Oct. 24, 1963   2 Sheets-Sheet 1
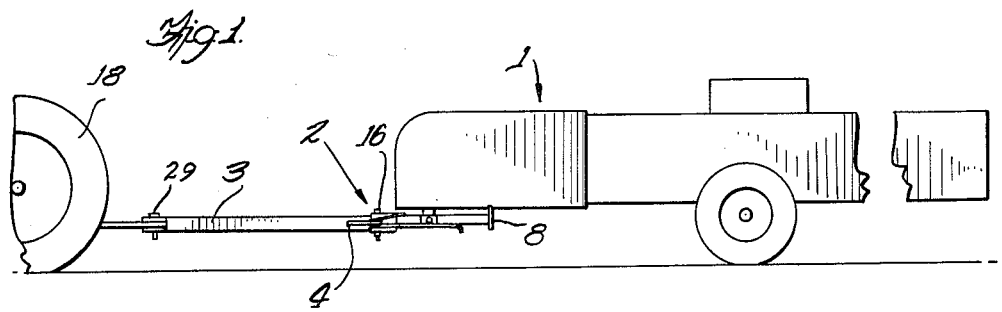
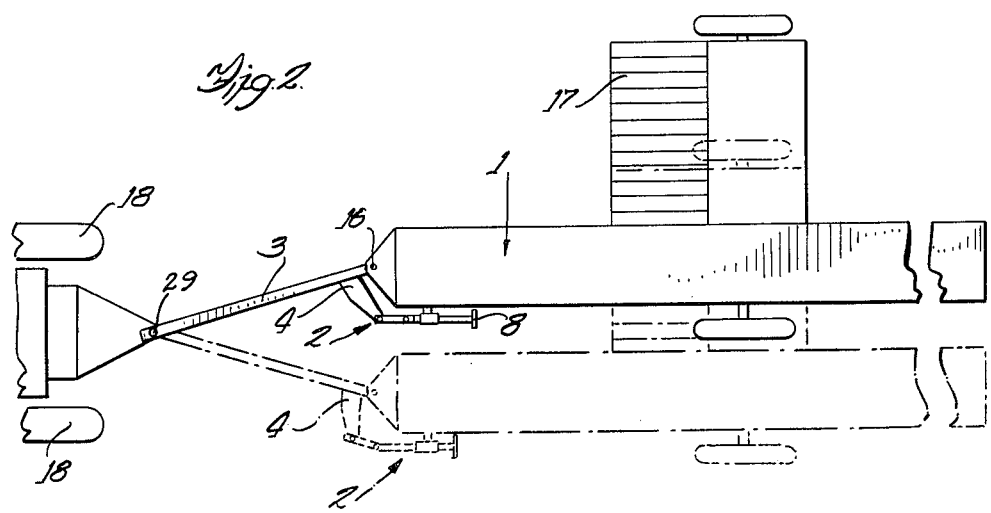
INVENTOR.
Doyle A. Bumpious
BY
Attorney Jan. 26, 1965  D. A. BUMPIOUS  3,167,327
STEERING AND SUPPORT DEVICE
Filed Oct. 24, 1963  2 Sheets-Sheet 2
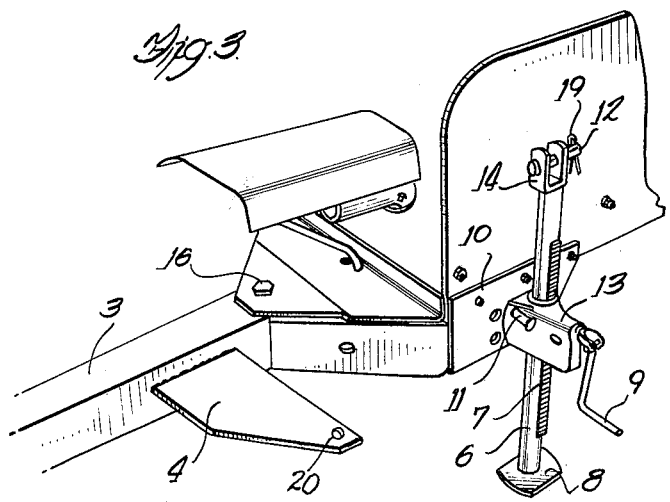
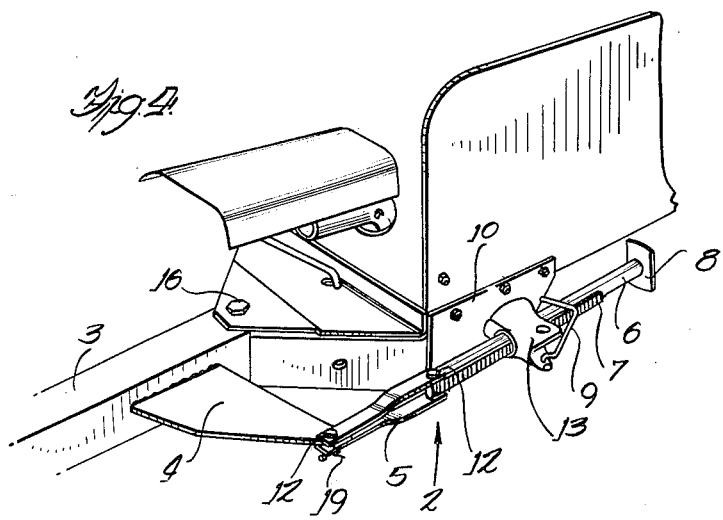
INVENTOR.
Doyle A. Bumpious
BY
Attorney

United States Patent Office 3,167,327
Patented Jan. 26, 1965

3,167,327
STEERING AND SUPPORT DEVICE
Doyle A. Bumpious, Memphis, Tenn., assignor to International Harvester Company, Chicago, Ill., a corporation of New Jersey
Filed Oct. 24, 1963, Ser. No. 318,584
4 Claims. (Cl. 280—464)

The present invention is a new and useful article of manufacture. More particularly, the invention comprises a single mechanism for adjusting the position of the tongue of a hay baler and for supporting the hay baler when it is unhitched from its tractor.

The advantages of the invention are reflected in its objects, which are:

First, to provide an inexpensive but effective mechanism for adjusting the angle of the hay baler hitch or tongue to the optimum towing angle for either baling position or transport position;

Second, to reduce manufacturing costs by also using the baler tongue adjusting mechanism as a support when the hay baler is unhitched from its tractor;

Third, to exploit the mechanical advantage of the ordinary jack to vary the towing angle of a baler hitch and to provide an adjustable support for the hay baler when it is unhitched from its tractor.

One physical embodiment of the invention is shown in the drawings, where

FIG. 1 is a side view of a hay baler showing the general location of the novel support and adjusting mechanism to the baler tongue;

FIG. 2 is a plan view of a hay baler showing the general location of the novel support and adjusting mechanism, the solid lines representing the baler and tongue in baling position and the broken lines representing the baler and tongue in transport position;

FIG. 3 is an isometric view of the support and adjusting mechanism used as a baler support; and FIG. 4 is an isometric view of the novel support and adjusting mechanism connected to the baler tongue.

The novel baler support and tongue adjusting mechanism of the present invention serves two needs of a hay baler or similar machine mounted on a pair of wheels and having a crop pick-up or similar mechanism projecting out to one side. In the case of such a machine, means must be provided for supporting the machine when it is unhitched from its tractor. Also, means must be provided so that the tractor can tow the hay baler from different positions as required by particular circumstances. For example, when the crop pick-up mechanism is in use, the baler must be positioned to the side of the tractor to be able to pick-up the windrows of hay. Similarly, when the hay baler is being transported to another work site, the baler usually must be towed directly behind the tractor, so that the baler does not project beyond the sides of any gateways or into other lanes, as along public roads, where legal limits for the width of vehicles apply.

The relation of the combined adjusting and support mechanism with respect to a hay baler is shown in FIG. 1. The hay baler is indicated generally by the numeral 1 and the adjusting and support mechanism by the numeral 2. The position of the hay baler and its tongue with respect to the tractor for both baling and transport service is shown in FIG. 2, where the solid lines represent baling service and the broken lines represent transport service. In FIG. 2 the tractor 18 tows the hay baler 1 by means of the baler tongue 3, which is attached to the baler 1 by pivot 16 and to the adjusting and support mechanism 2 by pivot arm 4.

FIG. 3 shows the adjusting and support mechanism 2 used as a baler support. A conventional rack and pinion jack (other types may also be used) is pivotably attached to the side 10 of the baler. The jack comprises a base 13 pivotable about an axis normal to baler side 10, so that the jack may be positioned either vertically (FIG. 3) or horizontally (FIG. 4). A lock 11 holds base 13 in either of the two positions shown. Jack leg or standard 6 with a rack 7 formed along one side thereof extends through a slot in base 13, rack 7 meshing with a pinion (not shown) on the inside of base 13. Crank 9 is used to manipulate the rack and pinion mechanism in order to vary the position of leg or standard 6 relative to base 13. Foot 8 located at one end of leg 6 bears against the underlying support surface—here, the ground—to uphold the baler.

In FIG. 4 the present invention is shown used as a tongue adjusting mechanism. Base 13 of the jack is positioned with the jack leg 6 horizontally. Link 5 is fastened at one end to jack leg 6 by pin 12 and at its other end to pivot arm 4 at pivot hole 15 by pin 12 and cotter 19. Pivot arm 4 is in turn welded or otherwise fastened to the baler tongue 3. An alternate form of link is shown in FIG. 3 at the U-shaped end 14 of leg 6 and slot (20) in pivot arm 4.

The operation of the baler support and tongue adjusting mechanism is as follows: In tongue adjusting service, the mechanism is arranged as shown in FIGS. 1, 2, and 4. As shown in solid lines in FIG. 2, the hay baler 1 is in baling position, that is, to the side of tractor 18, so that the tractor 18 is along side a windrow of hay and crop pick-up mechanism 17 is in line with the windrow. Hay baler 1 is locked in baling position by action of the rack 7 of tongue adjusting mechanism 2. To maneuver the hay baler 1 to transport position, crank 9 (FIG. 4) is operated to advance leg 6 and, thereby, change the angle between pivot tongue 3 and the longitudinal axis of baler 1. When the tractor and baler are moved forward, the baler then swings into transport position (shown in broken lines in FIG. 2) in response to the force exerted on pivot tongue 3. To place the baler in baling position, crank 9 is operated to retract jack leg 6.

When it is necessary to unhitch the baler from its tractor, the baler is supported on leg 6 of the jack. Leg 6 is disconnected from pivot arm 4 by removal of cotter 19 and pin 12. Base 13 of the jack is then rotated until leg 6 is vertical and foot 8 is adjacent the terrain. Lock 11 secures the leg 6 in support position. Crank 9 is then operated to lower leg 6 until it contacts the terrain and supports the weight of the baler. Tongue 3 is then disconnected from tractor 18 at 29.

According to the foregoing description, a new and improved adjustable baler tongue adjusting and support mechanism has been presented. Various modifications in the details of construction will be apparent to persons skilled in the art of hay balers and similar machines. For example, while the present invention is described as part of a hay baler, it may also be used with other agricultural machines having windrow or crop pick-up attachment (e.g. field choppers, hay loaders, combines, etc.). It is not intended, therefore, to limit the present invention to the exact form shown but to include all obvious variations, since they fall within the spirit and scope of the present invention.

The invention claimed is:

1. For an agricultural machine having a supporting structure and a draft tongue pivotally attached thereto, a steering and supporting device comprising: a jack assembly including a base portion and an extensible and retractable standard carried by said base portion, said base portion including means for mounting said base portion on one of said supporting structure and said tongue for movement from a first position where said standard is horizontally disposed to a second position where said standard is vertically disposed, said jack assembly including holding means for securing said base portion in at least one of said first and said second positions, said standard including a rest for supporting said machine when said standard is in said vertically disposed position, and connecting means on said standard for connecting said standard to one of said tongue and said supporting structure when said standard is in said horizontally-disposed position.

2. A steering and supporting device for an agricultural machine, as recited in claim 1, wherein said connecting means comprises: a pivot arm for permanent attachment to said tongue, and a link member on one of said pivot arm and said standard for connecting said standard to said pivot arm when said standard is in said horizontally disposed position.

3. A steering and supporting device for an agricultural machine, as recited in claim 1, wherein: said rest comprises a foot member attached to an end of said standard; said connecting means comprises a pivot arm for permanent attachment to a side of said tongue, and a U-shaped link member on an end of said standard for pivotally connecting said standard to said pivot arm when said standard is in said horizontally-disposed position.

4. A steering and supporting device for an agricultural machine, as recited in claim 1, wherein: said rest comprises a foot member attached to an end of said standard; said connecting means comprises a pivot arm for permanent attachment to a side of said tongue, and a pair of elongated link members projecting from an end of said standard for pivotally connecting said standard to said pivot arm when said standard is in said horizontally disposed position.

References Cited by the Examiner
UNITED STATES PATENTS

| | | | |
|---|---|---|---|
| 2,610,562 | 9/52 | Ward | 280—463 X |
| 2,809,574 | 10/57 | Hill et al. | 172—324 |
| 2,885,181 | 5/59 | McCully et al. | 280—150.5 X |

T. GRAHAM CRAVER, *Primary Examiner.*

ANTONIO F. GUIDA, *Examiner.*